United States Patent [19]

Hiraiwa

[11] Patent Number: 5,533,022
[45] Date of Patent: Jul. 2, 1996

[54] DIGITAL INTERFACE SYSTEM FOR OFFICES CONNECTED BY PLURAL DIGITAL LINES

[75] Inventor: Masashi Hiraiwa, Yokohama, Japan

[73] Assignee: Hitachi, Ltd., Tokyo, Japan

[21] Appl. No.: 393,892

[22] Filed: Feb. 24, 1995

Related U.S. Application Data

[63] Continuation of Ser. No. 153,107, Nov. 17, 1993, Pat. No. 5,420,854, which is a continuation of Ser. No. 716,933, Jun. 18, 1991, abandoned.

[30] Foreign Application Priority Data

Jun. 18, 1990 [JP] Japan ..................... 2-157522

[51] Int. Cl.⁶ .................. H04J 3/16; H04L 12/52
[52] U.S. Cl. ............ 370/68.1; 370/84; 370/110.1; 370/112
[58] Field of Search ............... 370/58.1, 58.2, 370/58.3, 60, 60.1, 62, 66, 68, 68.1, 79, 84, 94.1, 94.2, 110.1, 112, 118; 379/93, 94, 201

[56] References Cited

U.S. PATENT DOCUMENTS

| 4,547,877 | 10/1985 | Lehman et al. ................ 370/84 |
| 4,658,152 | 4/1987 | Walters ........................ 370/84 |
| 4,965,787 | 10/1990 | Almond et al. ................ 370/58.1 |
| 4,965,796 | 10/1990 | Petty .......................... 370/112 |
| 4,979,169 | 12/1990 | Almond et al. ................ 370/99 |
| 4,987,570 | 1/1991 | Almond et al. ................ 370/84 |
| 5,005,170 | 4/1991 | Nelson ........................ 370/84 |
| 5,014,266 | 5/1991 | Bales et al. ................... 370/60.1 |

FOREIGN PATENT DOCUMENTS

| 1-120931 | 5/1989 | Japan . |
| 1-291554 | 11/1989 | Japan . |

Primary Examiner—Alpus H. Hsu
Attorney, Agent, or Firm—Antonelli, Terry, Stout & Kraus

[57] ABSTRACT

A switching system between two offices connected by plural digital lines and an outband channel. Each digital line has plural channels, and each channel has a corresponding basic bit rate and is able to multiplex plural sub-rate channels so as to accommodate sub-rate calls. When one of the offices requests the setting of a sub-rate call, a digital interface system designates to the other office, through the outband channel, a sub-rate channel to be used and attribute information concerning the sub-rate channel. If the designated sub-rate channel is not usable by the receiving office, a control unit at the receiving office selects a usable sub-rate channel and informs the originating office that the sub-rate channel is changed to the usable sub-rate channel.

16 Claims, 8 Drawing Sheets

DIGITAL INTERFACE SYSTEM FOR OFFICES CONNECTED BY PLURAL DIGITAL LINES

This application is a Continuation of application Ser. No. 08/153,107, filed Nov. 17, 1993, now U.S. Pat. No. 5,420,854, which was a continuation of application Ser. No. 07/716,933, filed Jun. 18, 1991, now abandoned.

BACKGROUND OF THE INVENTION

1. Field of the Invention

The present invention relates to a digital interface system, and more particularly to a multi-channel multiplexing switching system and an inter-office signal system in a digital switching network arranged by connecting time-division switching systems through digital lines.

2. Description of the Prior Art

A time division switching system handles calls such as voice and data, having various bit rate. A circuit switching system handling 64 kbps as a unit can not perform multi-channel switching as achieved in a packet switching system. Accordingly, in order to increase transmission efficiency, generally, a time slot on a transmission line is fixedly assigned previously for each kind of bit rate in accordance with an attribute of a terminal.

On the other hand, JP-A-1-120931 discloses a system in which a link between opposite offices is established in accordance with generation characteristics of calls. This system has an improved transmission efficiency as compared with a system having a fixedly assigned time slots but does not include means for informing the opposite office (opposite switch) of attribute information of a multi-channel call.

Further, JP-A-1-291554 discloses a system in which sub-rate call information is transferred by the inband signalling channel in the sub-rate switching using multiplex circuit.

In the above described conventional systems, since the conventional system disclosed in JP-A-1-120931 does not include the means for informing the opposite office (opposite switch) of the attribute information a of multi-channel call, it is necessary to handle multi-channel calls having coincident recognition between opposite offices and accordingly there is a problem in the effective utilization of circuits.

Further, as disclosed in JP-A-1-291554, the system for transferring the sub-rate call information by the inband signalling channel in the sub-rate switching using multiplex circuit has the following problems.

(1) Two-stage call setting procedures of a procedure for setting a B channel call of 64 kbps and a procedure of setting a sub-rate call on the B channel are required, and the call control structure is complicated.

(2) In transfer of sub-rate call setting information by the inband, it is difficult to transfer facility information for permitting additional services between switching systems.

SUMMARY OF THE INVENTION

It is an object of the present invention to provide a digital interface system capable of attaining effective utilization of circuits by providing sub-rate switching in which compressed voice and data of a low-speed terminal on a digital transmission line having a basic bit-rate (e.g. 64 kbps) as a unit are multiplexed and transmitted in the circuit switching having the basic bit-rate (e.g. 64 kbps) as a unit.

It is another object of the present invention to provide a digital interface system taking simplicity of call control structure and ease of expansion of additional services into consideration.

In order to achieve the objects, the sub-rate calls of $8^k \times n$ bps (where n=1, 2, . . . ) are multiplexed in any combination on a digital transmission path having a basic (unit) bit-rate (64 kbps) as a unit.

Further, in order to set the sub-rate call of $8^k \times n$ bps in response to a call setting request from a low-speed data terminal, if a circuit switching call of 64 kbps is already set between the switching offices and the multiplex communication can be made at a rate required by the sub-rate call, the multiplex operation is made on the 64 kbps circuit switching call to set the sub-rate call between terminals. On the other hand, if the sub-rate call can not be set, a circuit switching call having a new basic bit rate (64 kbps) is set between the switching offices at a time of occurrence of the sub-rate call if necessary to set the sub-rate call between the terminals.

The sub-rate call of $8^k \times n$ bps is multiplexed in any combination thereof on the digital transmission path having the circuit switching of 64 kbps as a unit so that the digital line is effectively utilized.

Further, the fact that the circuit switching call of 64 kbps is set between the switching offices at the time of occurrence of the sub-rate call if necessary is based on realization of the function that, in order to set the sub-rate call of $8^k \times n$ bps between the switching offices in response to the call setting request from the low-speed data terminal, if the circuit switching call of 64 kbps is already set between switching offices and multiplex communication can be made at a rate required by the sub-rate call, the multiplexing operation is made on the 64 kbps circuit switching call to set the sub-rate call between terminals, and if the multiplex communication can not be made at the required rate, a circuit switching call having a new bit rate of 64 kbps is set between the switching offices to set the sub-rate call between the terminals. Thus, when the call charge is made in a unit of the circuit switching call of 64 kbps in the public switching network, the effective multiplexing system of the sub-rate call is attained.

DESCRIPTION OF THE PREFERRED EMBODIMENTS

Embodiments of the present invention are now described with reference to FIGS. 1 to 8.

Figure 1:
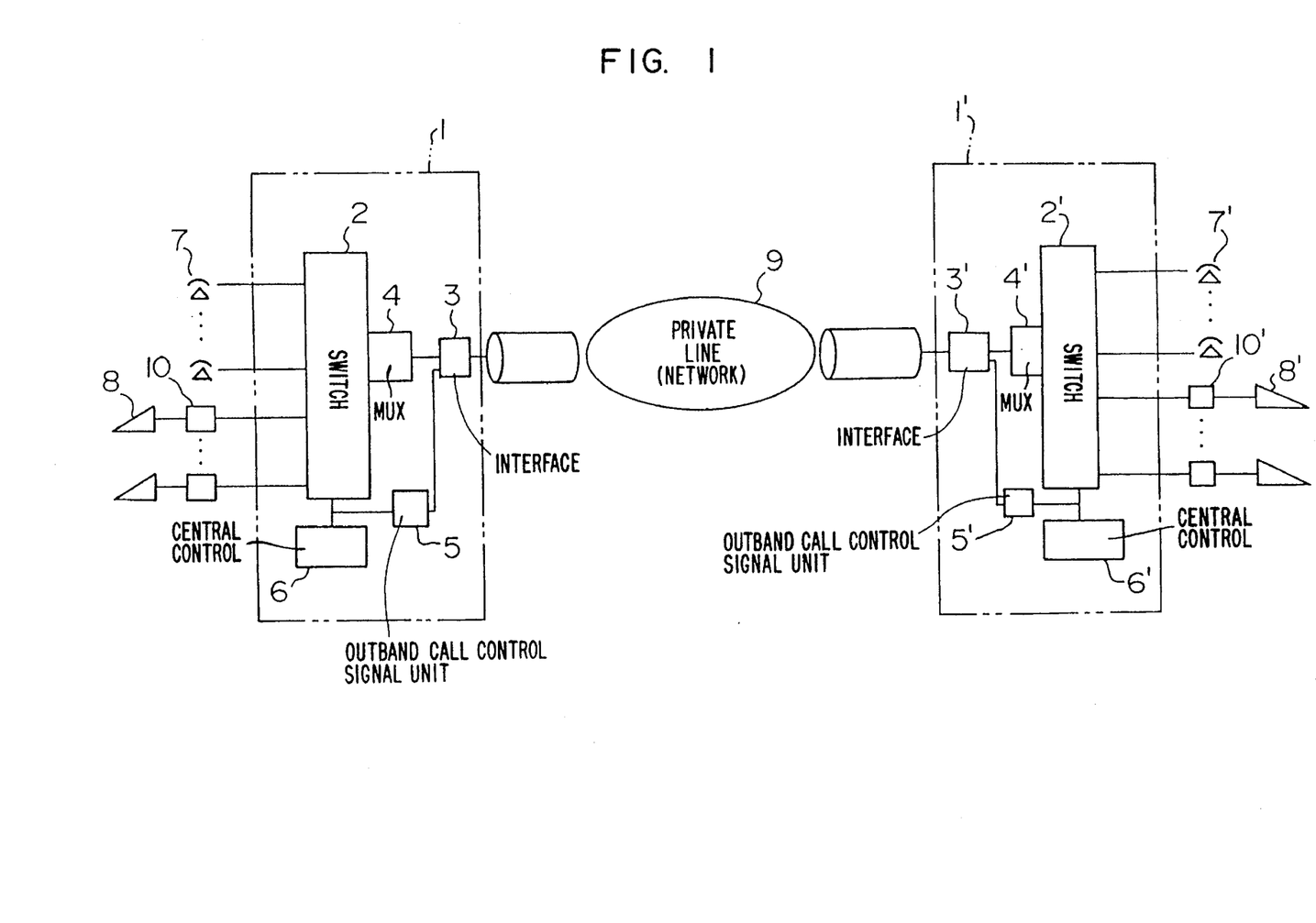
FIG. 1 is a system configuration diagram using a digital interface system according to the present invention.
Figure 1A:
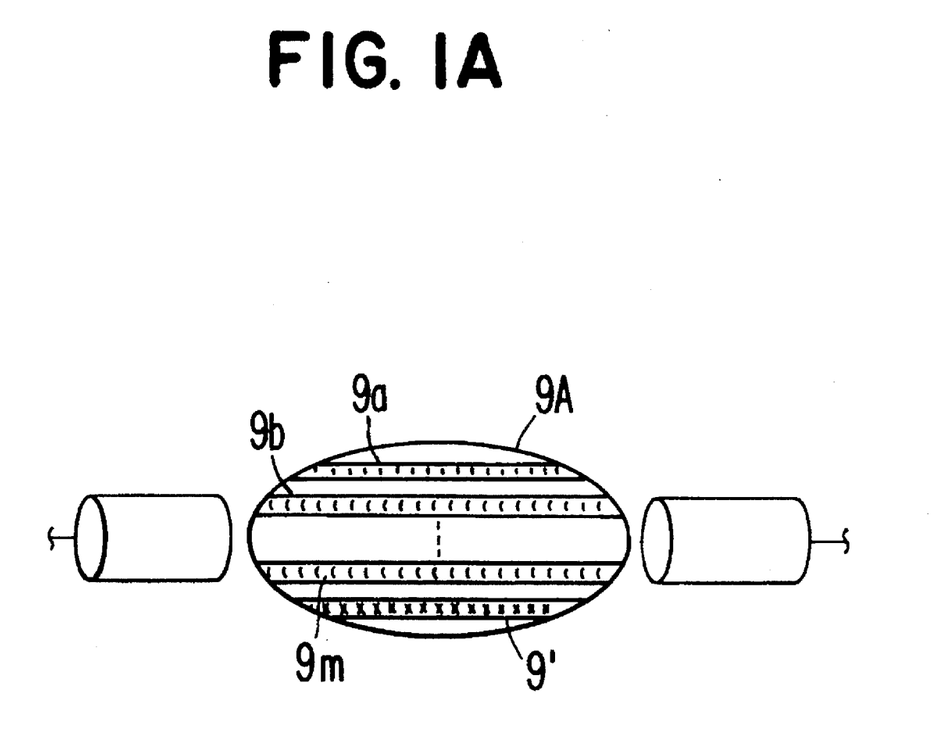
FIG. 1A is a partial system configuration diagram of an alternative embodiment of a digital interface system according to the present invention.

Referring to FIG. 1 showing a trunking system of the present invention, switching offices 1 and 1' include respectively switches 2 and 2', digital trunk interface units 3 and 3', multi-channel multiplexing units 4 and 4' (hereinafter referred to as a sub-rate multiplexing and separating trunk) connected to the switches through highway interfaces), outband call control signal units 5 and 5' (hereinafter abbreviated as a DCH) and central control units 6 and 6', respectively. The switching offices 1 and 1' accommodate telephones 7 and 7' and data terminals 8 and 8' connected through adapters 10 and 10' having rate matching function, respectively.

Further, switching offices 1 and 1' are connected through the digital trunk interface units 3 and 3' to a digital private line (network) 9. In addition to digital private line 9 depicted in FIG. 1, the connection might be by network 9A, depicted in FIG. 1A, including plural digital lines 9a, 9b. . . 9m, together with outband channel 9'. The foregoing description is made to a logical structure between switching offices connected through the digital private line (network), and the apparatus configuration required generally for a switching system except the above structure is omitted.

Figure 2:
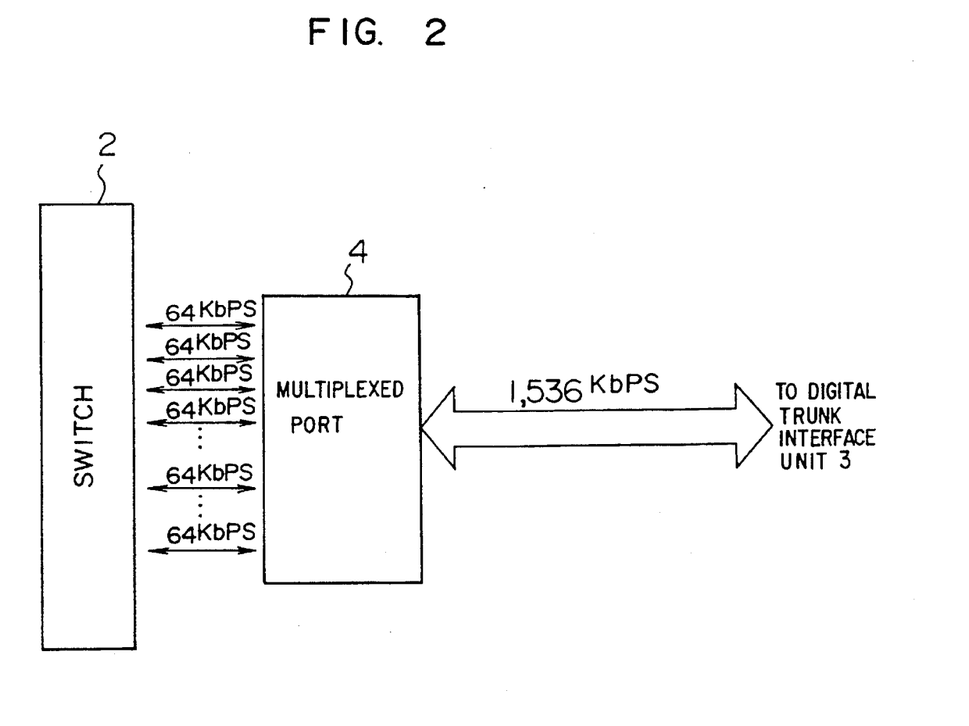
FIG. 2 illustrates a sub-rate multiplexing and separating trunk.
Figure 3:
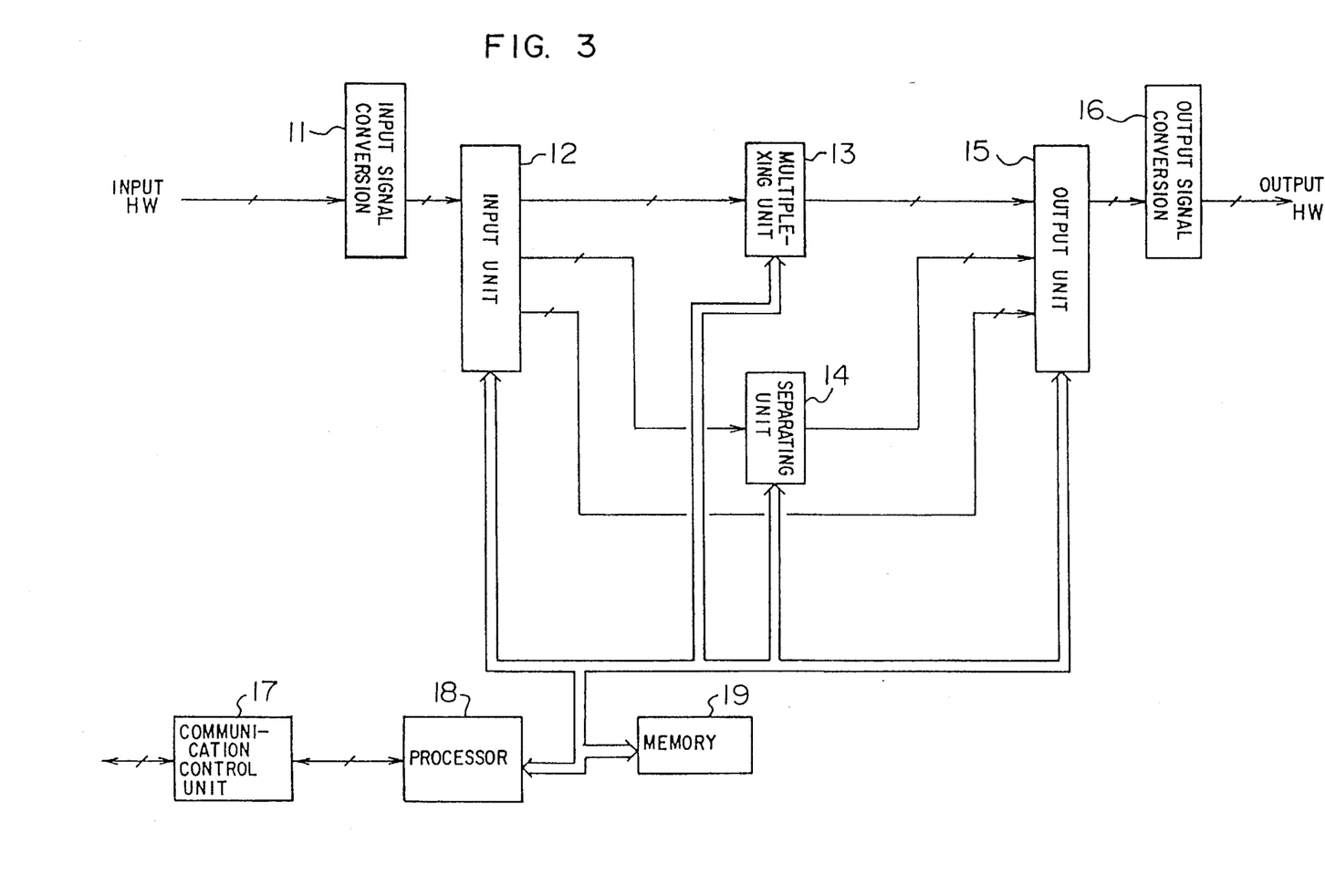
FIG. 3 is a functional block diagram of the sub-rate multiplexing and separating trunk.

The function of the sub-rate multiplexing and separating trunk 4 is now described with reference to FIGS. 2 and 3. A plurality of channels of signal of 64 kbps, which is a switching unit in the switch 2 supplied to the sub-rate multiplexing and separating trunk 4, are multiplexed in a unit (hereinafter referred to as a sub-rate channel) equal to n (n=1, 2, 4, 8) times 8 kbps (corresponding to 1 bit in a time slot, and hereinafter this unit is referred to as a sub-channel) by a multiplexing unit 13. The multiplexed signal produced therefrom is supplied through an output unit 15 and an output signal converting unit 16 to the digital trunk interface unit 3 as a signal of 1,536 kbps, for example. Further, the signal supplied from the digital trunk interface unit 3 is separated in a separating unit 14 into the recognized signal of 8 kbps×n and is produced as signal of 64 kbps in the switch 2 similarly.

A signal produced from the audio or voice terminal 7 and recognized by the switching office 1 is compressed to occupy the sub-rate channel of, for example, 32 kbps and is transmitted through the digital private line 9 to the opposite switching office, in which the signal of 32 kbps extracted from the recognized sub-rate channel is decoded into 64 kbps.

The digital data from the data terminal 8 is subjected to rate adjustment at the time of input to the sub-rate multiplexing and separating trunk 4 so that the data format thereof is converted into 64 kbps, which is a switching unit of the switch in accordance with the rate adaptation prescribed by CCITT Recommendation V110. The sub-rate multiplexing and separating trunk 4 extracts the intermediate rate (8k/16k/32k) thereof in an input signal converting unit 11 and an input unit 12, and its unit is converted to a sub-rate channel so that the data is subjected to a multiplexing and separating operation in the multiplexing unit 13 and the separating unit 14. The multiplexing and separating operation is made in a processor 18 and a memory 19 through a communication control interface 17 on the basis of a command from the central control units 6 and 6'.

Figure 4:
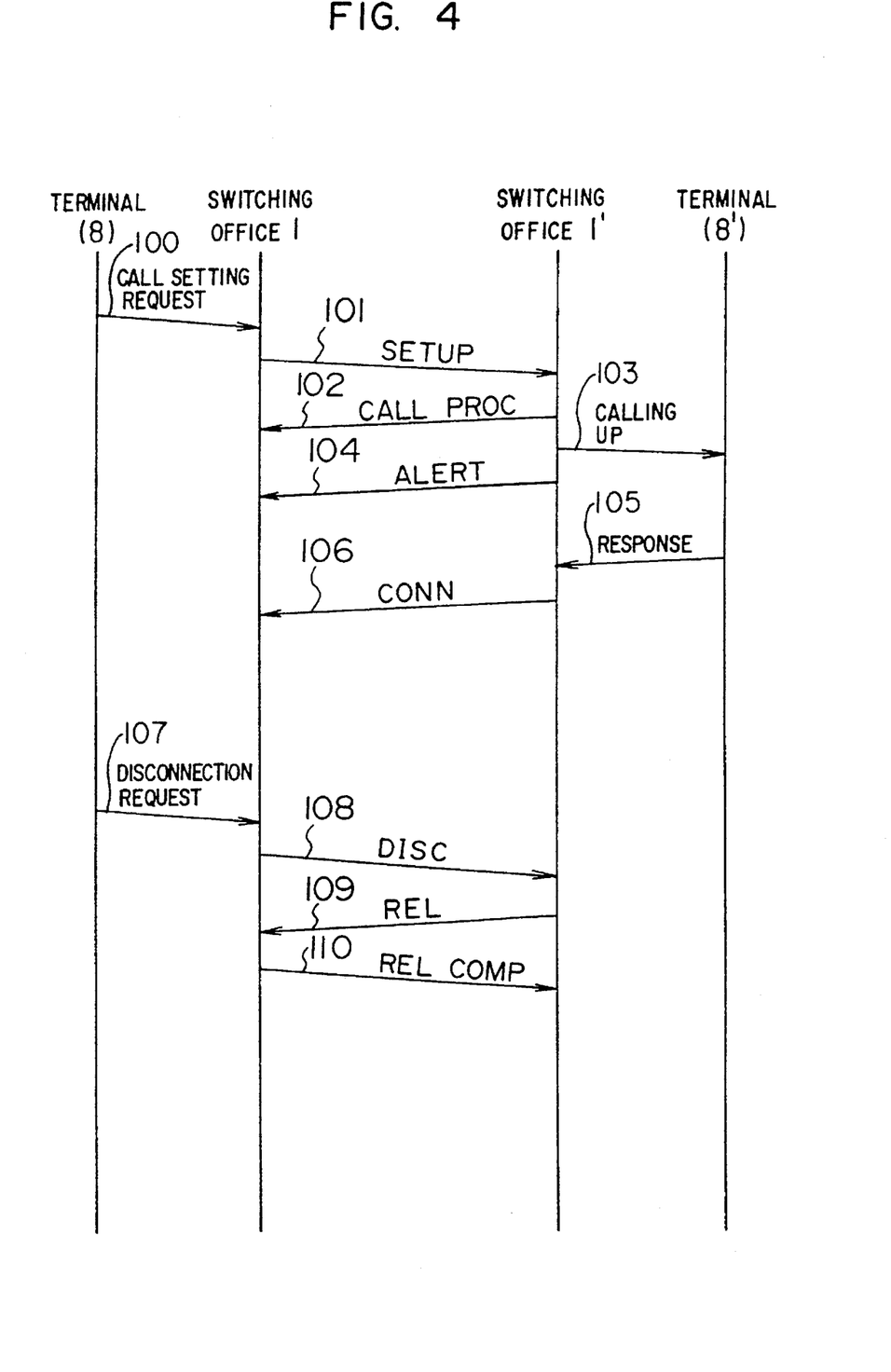
FIG. 4 is a diagram showing a call setting sequence.

Referring now to FIG. 4, a call setting sequence in the case where a call by the sub-rate channel is set between the switching offices is described. In this example, description is made to the call setting procedure between terminals connected to two private branch exchanging systems (hereinafter abbreviated as a PBX) connected to each other through the digital private line 9.

A method based on the D channel signalling procedure prescribed in CCITT Recommendation Q930 series, for example, is applied to the call setting procedure between the two PBX's through the digital private line 9.

Figure 5:
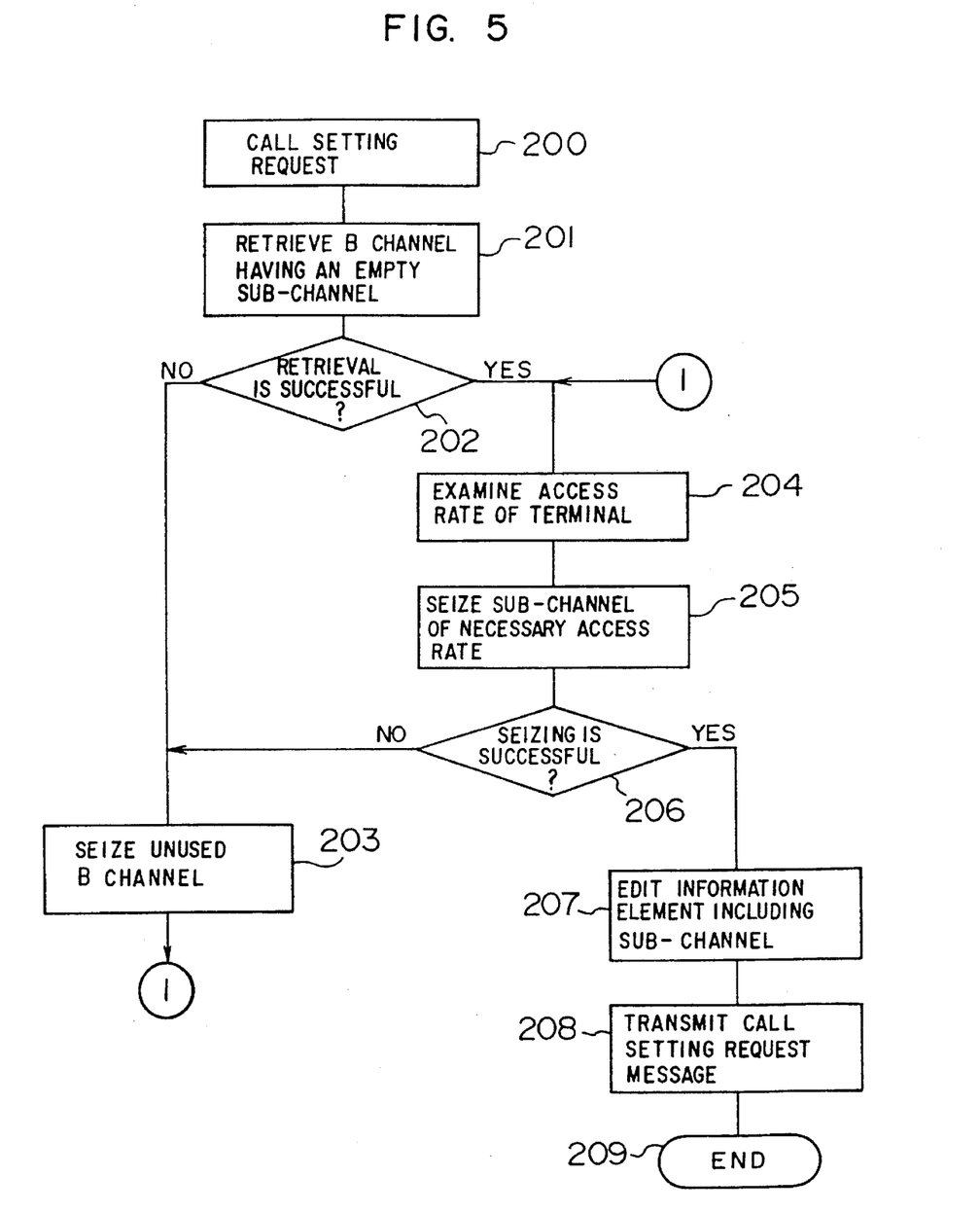
FIG. 5 is a flow chart showing a channel seizing procedure upon the call setting request.
Figure 6:
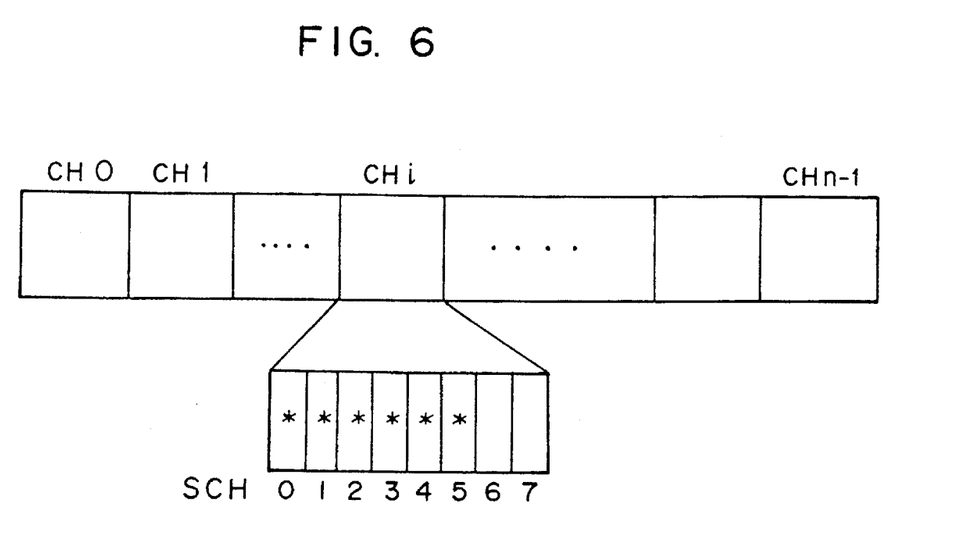
FIG. 6 shows a B channel and sub-channel administration table.

A procedure of transmitting a call setting request (SETUP) message 101 to the opposite PBX in response to the call setting request from the terminal 7 (8) to seize the sub-rate channel is shown in FIG. 5. The call setting request procedure is required to seize a communication channel to be used. Generally, the channels are administered by a table in which used and unused channels are listed. When a call by the sub-rate channel is set, a structure for displaying the situation of used and unused sub-channels is added to a structure of an administration table for used and unused communication channels (hereinafter referred to as a B channel) having a unit of 64 kbps. FIG. 6 shows an example of a structure of the administration table in which the use situation of the B channels and the sub-channels is displayed.

When the call setting request 100 is issued from the terminal 7 (8), the central control unit 6 seizes the sub-channel to be used for communication in accordance with the procedure shown in FIG. 5 while using the channel administration table shown in FIG. 6.

(1) A B channel in which an empty sub-channel is present is retrieved (201). If the retrieval of the B channel in which an empty sub-channel is present fails, an unused B channel is seized and is subjected to the following processing (202 and 203).

(2) An access rate of the terminal is examined (204). The access rate of the terminal is recognized by the switching system on the basis of a notification from the terminal or attribute information of the terminal administered by the switching system. For example, when the terminal is an audio or voice terminal, the access rate is a compressed rate, and when the terminal is a data terminal, the access rate is an intermediate rate corresponding to the rate of the terminal (by CCITT V110 rate adaptation regulation).

(3) A sub-channel of the necessary access rate is retrieved within the retrieved B channel (205 and 206). In FIG. 6, for example, a sub-rate channel of 16 kbps can be seized in CHi having an empty sub-channel, while a sub-channel of 32 kbps can not be seized. When seizing of the sub-rate channel in the B channel having an empty sub-channel fails, an unused B channel is seized in (6) (203).

Figure 7:
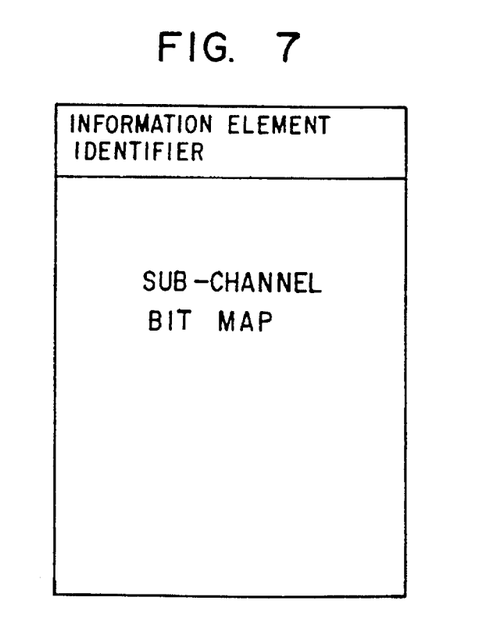
FIG. 7 shows sub-channel information element.

(4) When the sub-rate channel is seized successfully, information element of a message (SETUP) for performing the call setting request to the opposite office is edited (207). The call setting request message includes a sub-channel identifier of the type as shown in FIG. 7 and represents the position and the number of the sub-channels in the B channel designated by the call.

(5) Information element necessary for the call setting request except the sub-channel identifier is edited, and the call setting request message (SETUP) 101 is transmitted to the opposite office 1' through the DCH 5.

(6) When seizing of the sub-rate channel is failed, an unused B channel is seized so that seizing of a sub-rate channel is made for the B channel in accordance with the procedure of (3) et seq. (203).

In the switching office 1', when the SETUP message 101 is received, the sub-rate channel designated by the channel and sub-channel identifier information elements of the SETUP message 101 are seized.

At this time, when the sub-rate channel designated by the switching office 1 can not be seized in the switching office 1', due to collision upon seizing of the channel or the like, and the channel can be changed due to the channel selection condition in the switching office 1, the sub-rate channel can be seized in the switching office 1' in the same procedure (above steps (2) to (6)) as the sub-rate channel is seized in the switching office 1, and change of the sub-rate channel can be indicated to the switching office 1 by means of a call setting reception message (CALL PROC) from the switching office 1'.

In the switching office 1, connection of the B channel is made in response to reception of the CALL PROC message 102 from the switching office 1' if the B channel is not connected.

As described above, the circuit switching call of 64 kbps is set between the switching offices at the time of occurrence of the sub-rate call if necessary. That is, in order to set the sub-rate call of $8^k \times n$ bps between the switching offices in accordance with the call setting request from the low-speed data terminal, if the circuit switching call of 64 kbps is already set between the switching offices and multiplex communication can be made at the rate required by the sub-rate call, the multiplexing operation is made on the 64 kbps circuit switching call to set the sub-rate call between terminals, and if the multiplex communication can not be made at the required rate, a circuit switching call having a new bit rate of 64 kbps is set between the switching offices to set the sub-rate call between the terminals (103 to 106). In FIG. 4, ALERT 104 represents a calling message and CONN 106 represents a response message.

Figure 8:
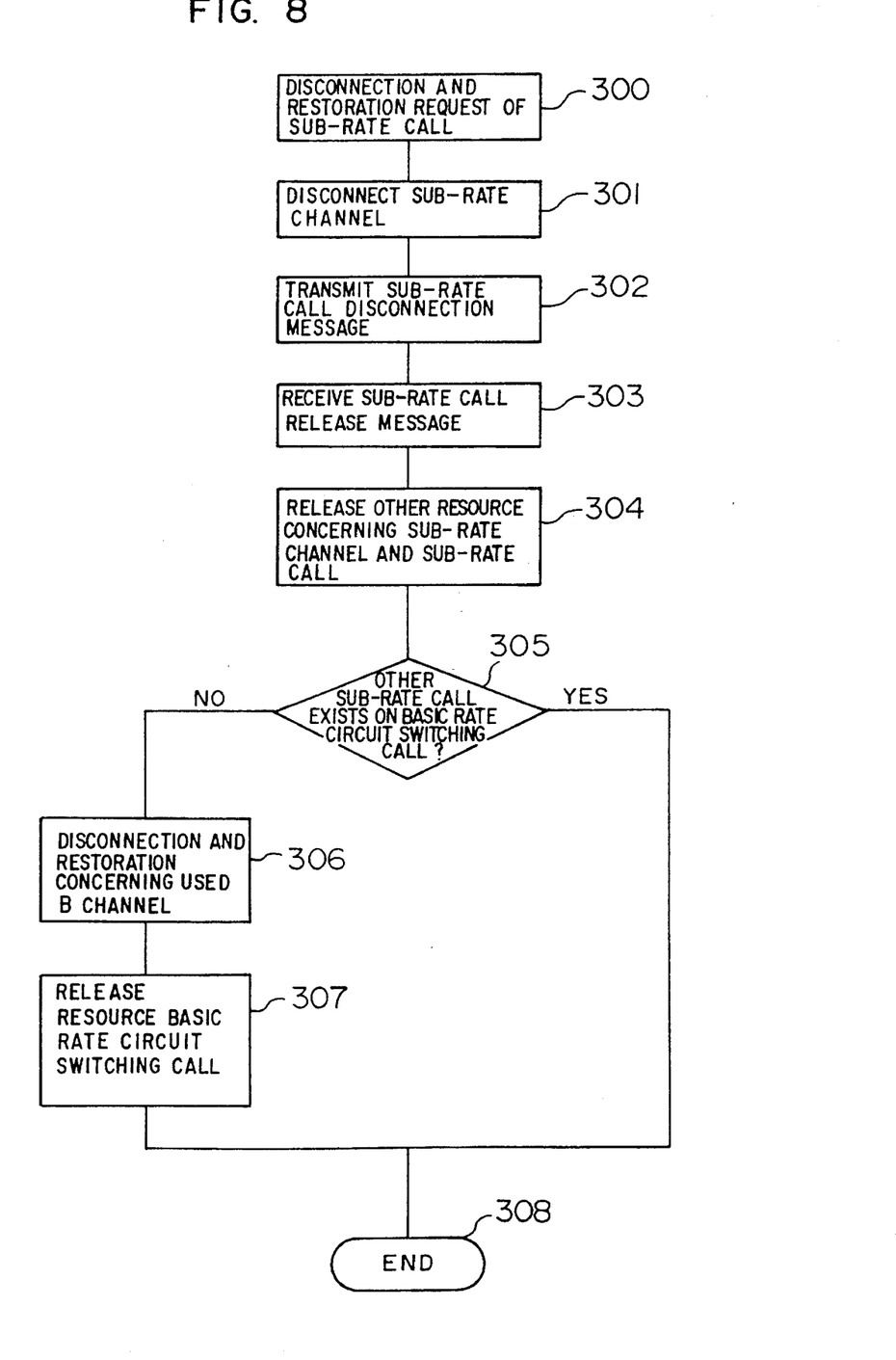
FIG. 8 is a flow chart showing a procedure upon a call restoration request.

In the communication state of the sub-rate call between terminals, when restoration or disconnection request 107 is issued from the terminal 7 (8) as shown in FIGS. 4 and 8, only the sub-rate channel occupied by the sub-rate call is released, and the circuit switching call of 64 kbps between the switching offices is held if another sub-rate call exists on the circuit switching call between the switching offices used by the sub-rate call (305). If another sub-rate call does not exist on the circuit switching call of 64 kbps between the switching offices used by the sub-rate call to which the release request is issued, the sub-rate channel occupied by the sub-rate call is released as shown by 306 and 307 of FIG. 8, and the channel set between the switching offices is disconnected and released (108 to 110). In FIG. 4, DISC 108 represents a disconnection message, REL 109 represents a release message, and REL COMP 110 represents a release completion message.

As described above, the circuit switching call between the switching offices is set by the call setting request from the low-speed data terminal if necessary so that the digital line can be utilized effectively.

According to the present invention, the sub-rate calls of $8^k \times n$ bps are multiplexed in any combination on the digital transmission path performing the circuit switching of 64 kbps as a unit, so that the sub-rate call for the low-speed data terminal and the compressed voice can be multiplexed on the digital line effectively.

Further, the circuit switching call of 64 kbps is set between the switching offices at the time of occurrence of the sub-rate call if necessary to attain the multiplexing system effective particularly in the digital circuit switching network effecting the call charge in a unit of the circuit switching call of 64 kbps in the public switching network.

In the system in which the sub-rate call information is transferred by the inband signalling channel in the sub-rate switching by the circuit multiplexing as shown in the prior art, there is a problem that control of a call is complicated since it is necessary to make classification into two stages (2 kinds) of the sub-rate call setting and the 64 kbps B channel call setting. In the present invention, however, control can be attained by the call setting procedure unified by D channel.

Furthermore, in the inband transfer system of the sub-rate call information as shown in the prior art, transfer of facility information for providing additional services between the switching offices is difficult. However, in the transfer of the sub-rate call information by the D channel according to the present invention, the facility information can be transferred at the same level as that of the general B channel, and additional services between the switching offices by the sub-rate call can be provided.

What is claimed is:

1. A switching system between two switching offices, one switching office being an originating switching office and the other switching office being a receiving switching office, the originating switching office including means for receiving low-speed data or audio information from a low-speed terminal, said switching system comprising:

a plurality of digital lines, each digital line having a plurality of first channels thereon, each first channel having a corresponding basic bit rate and adapted to multiplex a plurality of sub-rate channels, each sub-rate channel accommodating a sub-rate call at a sub-rate which is an intermediate rate between the low-speed rate and the basic bit rate;

an outband channel;

a digital interface system responsive to a request from the originating switching office for setting a sub-rate call between terminals at the two switching offices, for designating to the receiving switching office, through the outband channel, a sub-rate channel to be used and attribute information concerning the sub-rate channel, for seizing and releasing the designated sub-rate channel, and for controlling the connection and disconnection of the designated sub-rate channel; and a control unit at the receiving switching office and responsive to the sub-rate channel designated by the originating switching office not being usable by the receiving switching office, for selecting a usable sub-rate channel and informing the originating switching office that the designated sub-rate channel is changed to the usable sub-rate channel.

2. A system according to claim 1, wherein the basic bit rate is 64 kbps.

3. In a switching system including in each of two switching offices a time division switch, a multiplexing unit connected to said time division switch for multiplexing low-speed data or audio information received from a low-speed terminal through the time division switch into data at a respective basic bit rate, with a sub-rate intermediate the low-speed rate and the basic bit rate, and a circuit interface unit for a plurality of digital lines, each digital line having a plurality of first channels thereon, each first channel having a corresponding basic bit rate and adapted to multiplex a plurality of sub-rate channels, each sub-rate channel accommodating a sub-rate call at the sub-rate, a sub-rate switching method for use in response to a request for setting a sub-rate call between the two switching offices, said method comprising in sequence the steps of:

(a) determining whether a first channel, having a corresponding basic bit rate, is already set between the two switching offices;

(b) when a first channel is not already set between the two switching offices, setting one of the first channels on one of the digital lines, the set first channel having a corresponding basic bit rate;

(c) when a first channel is set between the two switching offices, determining whether a new multiplex communication can be made on the set first channel at a rate required by a sub-rate call;

(d) when the multiplex communication cannot be made on the set first channel at the required rate, setting another one of the first channels on any one of the digital lines, the newly set first channel having a corresponding basic bit rate, and returning to step (c); and (e) when the first channel is set between the two switching offices and the multiplex communication can be made at the required rate, making the multiplex communication on the set first channel at the required rate, to set the sub-rate call between the terminals of the two switching offices.

4. A method according to claim 3, further comprising, when the sub-rate call between the terminals is restored and other calls multiplexed at respective basic bit rates exist on the set first channel, restoring only the sub-rate call, and when no other call multiplexed at the respective basic bit rates exists, restoring the set first channel at the corresponding basic bit rate between the switching offices to effectively utilize the digital line between the switching offices.

5. A method according to claim 3, wherein the basic bit rate is 64 kbps.

6. A method according to claim 3, wherein step (e) includes processing the call by an identical protocol without regard to whether the call is a sub-rate call or a basic call.

7. A method according to claim 6, wherein the protocol comprises CCITT Recommendation Q930.

8. A switching system between two switching offices, one switching office being an originating switching office and the other switching office being a receiving switching office, the originating switching office including means for receiving low-speed data or audio information from a low-speed terminal, said switching system comprising:

at least one digital line, each digital line having a plurality of first channels and a control channel thereon, each first channel having a corresponding basic bit rate and adapted to multiplex a plurality of sub-rate channels, each sub-rate channel accommodating sub-rate calls at sub-rates which are intermediate rates between the low-speed rate and the basic bit rate;

an outband channel;

a digital interface system responsive to a request from the originating switching office for setting a sub-rate call between terminals at the two switching offices, for selecting a sub-rate channel based on the time of setting of the sub-rate call, and designating to the receiving switching office, through the outband channel, the selected sub-rate channel to be used and attribute information concerning the selected sub-rate channel, for seizing and releasing the selected sub-rate channel, and for controlling the connection and disconnection of the selected sub-rate channel; and means at the receiving switching office responsive to the sub-rate channel designated by the originating switching office not being usable by the receiving switching office, for selecting a usable sub-rate channel and informing the originating switching office that the designated sub-rate channel is changed to the usable sub-rate channel.

9. A system according to claim 8, wherein the basic bit rate is 64 kbps.

10. In a switching system including in each of two switching offices a time division switch, a multiplexing unit connected to said time division switch for multiplexing low-speed data or audio information received from a low-speed terminal through the time division switch into data at a respective basic bit rate, with a sub-rate intermediate the low-speed rate and the basic bit rate, and a circuit interface unit for at least one digital line, each digital line having thereon a plurality of first channels and a control channel, each first channel having a corresponding basic bit rate and adapted to multiplex a plurality of sub-rate channels, each sub-rate channel accommodating a sub-rate call at the sub-rate, a sub-rate switching method for use in response to a request for setting a sub-rate call between the two switching offices, said method comprising in sequence the steps of:

(a) determining whether a first channel, having a corresponding basic bit rate, is already set between the two switching offices;

(b) when a first channel is not already set between the two switching offices, selecting a sub-rate based on the time of setting of the sub-rate call, and setting one of said first channels, having a corresponding basic bit rate;

(c) when a first channel is set between the two switching offices, determining whether a new multiplex communication can be made on the set first channel at a rate selected for the sub-rate call;

(d) when the multiplex communication cannot be made on the set first channel at the selected rate, setting another one of said first channels, having a corresponding basic bit rate, between the two switching offices and returning to step (c); and (e) when the first channel is set between the two switching offices and the multiplex communication can be made at the selected rate, making the multiplex communication at the selected rate to set the sub-rate call between the terminals of the two switching offices.

11. A method according to claim 10, further comprising, when the sub-rate call between the terminals is restored and other calls multiplexed at respective basic bit rates exist on the first channel, restoring only the sub-rate call, and when no other call multiplexed at the respective basic bit rates exists, restoring the first channel at the corresponding basic bit rate between the switching offices to effectively utilize the digital line between the switching offices.

12. A method according to claim 10, wherein the basic bit rate is 64 kbps.

13. A method according to claim 10, wherein step (e) includes processing the call by an identical protocol without regard to whether the call is a sub-rate call or a basic call.

14. A method according to claim 13, wherein the protocol comprises CCITT Recommendation Q930.

15. A switching system between two switching offices, one switching office being an originating switching office and the other switching office being a receiving switching office, the originating switching office including means for receiving low-speed data or audio information from a low-speed terminal, said switching system comprising:

at least one digital line, each digital line having a plurality of first channels and a control channel thereon, each first channel having a corresponding basic bit rate and adapted to multiplex a plurality of sub-rate channels, each sub-rate channel accommodating a sub-rate call at a sub-rate which is an intermediate rate between the low-speed rate and the basic bit rate;

an outband channel;

a digital interface system responsive to a request from the originating switching office for setting a sub-rate call between terminals at the two switching offices, for designating to the receiving switching office, through the outband channel, a sub-rate channel to be used and attribute information concerning the sub-rate channel, for seizing and releasing the sub-rate channel, and for controlling the connection and disconnection of the sub-rate channel;

means at the receiving switching office responsive to the sub-rate channel designated by the originating switching office not being usable by the receiving switching office, for selecting a usable sub-rate channel and informing the originating switching office that the designated sub-rate channel is changed to the usable sub-rate channel; and means responsive to an increase in the traffic load between the two switching offices for changing the sub-rate call to a lower rate, and further responsive to a decrease in the traffic load between the two switching offices for changing the sub-rate call to a higher rate.

16. In a switching system including in each of two switching offices a time division switch, a multiplexing unit connected to said time division switch for multiplexing low-speed data or audio information received from a low-speed terminal through the time division switch into data at a respective basic bit rate, with a sub-rate intermediate the low-speed rate and the basic bit rate, and a circuit interface unit for at least one digital line, each digital line having thereon a plurality of first channels and a control channel, each first channel having a corresponding basic bit rate and adapted to multiplex a plurality of sub-rate channels, each sub-rate channel accommodating a sub-rate call at the sub-rate, a sub-rate switching method for use in response to a request for setting a sub-rate call between the two switching offices during an interval of a first traffic load between the two switching offices, said method comprising in sequence the steps of:

(a) determining whether a first channel, having a corresponding basic bit rate, is already set between the two switching offices;

(b) when a first channel is not already set between the two switching offices, setting one of said first channels, having a corresponding basic bit rate;

(c) when a first channel is set between the two switching offices, determining whether a new multiplex communication can be made on the set first channel at a rate required by a sub-rate call;

(d) when the multiplex communication cannot be made on the set first channel at the required rate, setting another one of said first channels, having a corresponding basic bit rate, between the two switching offices and returning to step (c);

(e) when the first channel is set between the two switching offices and the multiplex communication can be made at the required rate, initiating the multiplex communication at the required rate to set the sub-rate call between the terminals of the two switching offices;

(f) when the traffic load between the two switching offices increases from the first traffic load, changing the sub-rate call to a lower rate; and (g) when the traffic load between the two switching offices decreases, changing the sub-rate call to a higher rate.

* * * * *